Feb. 6, 1962　　　J. C. M. FROST　　　3,020,002
VERTICAL TAKE-OFF AIRCRAFT CONTROL
Filed May 9, 1955　　　　　　　　　　　7 Sheets-Sheet 1
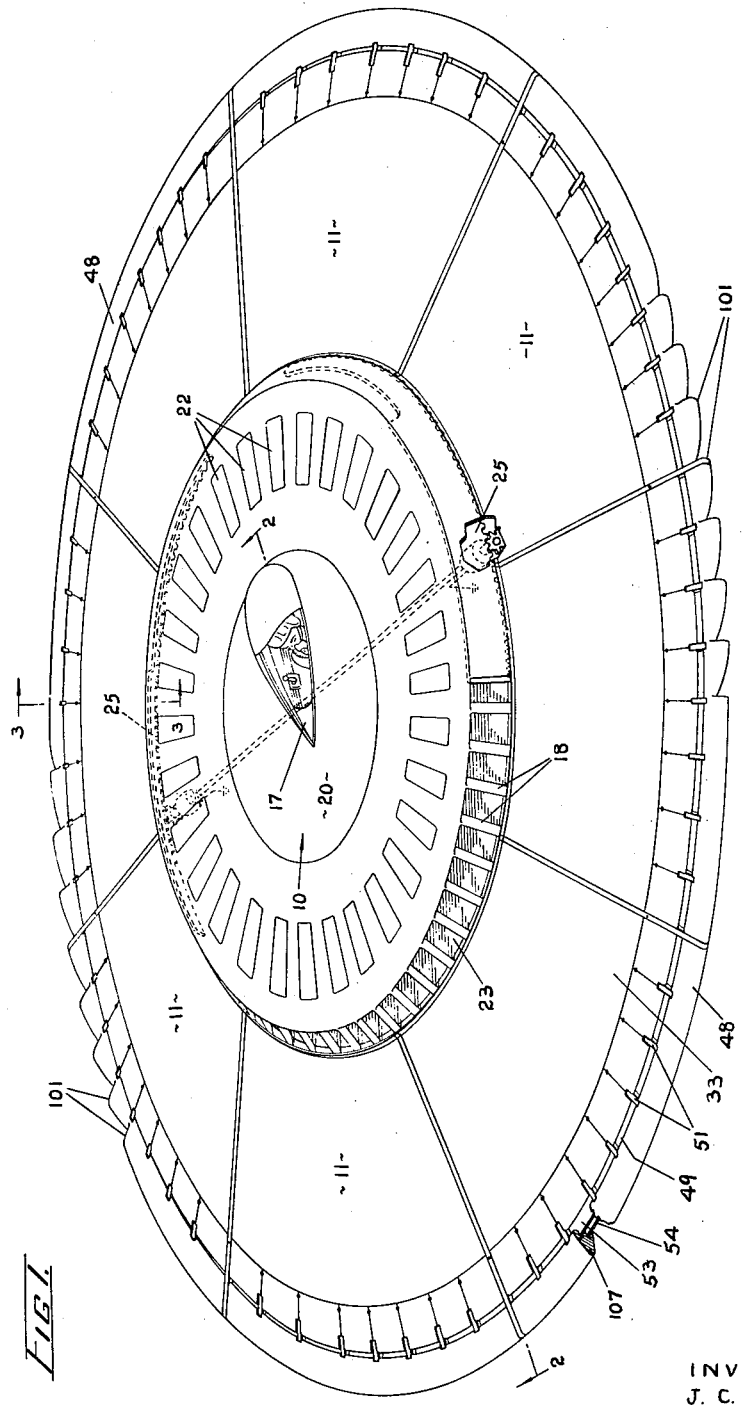
INVENTOR
J. C. M. FROST
BY
Maybee & Legris
ATTORNEYS.

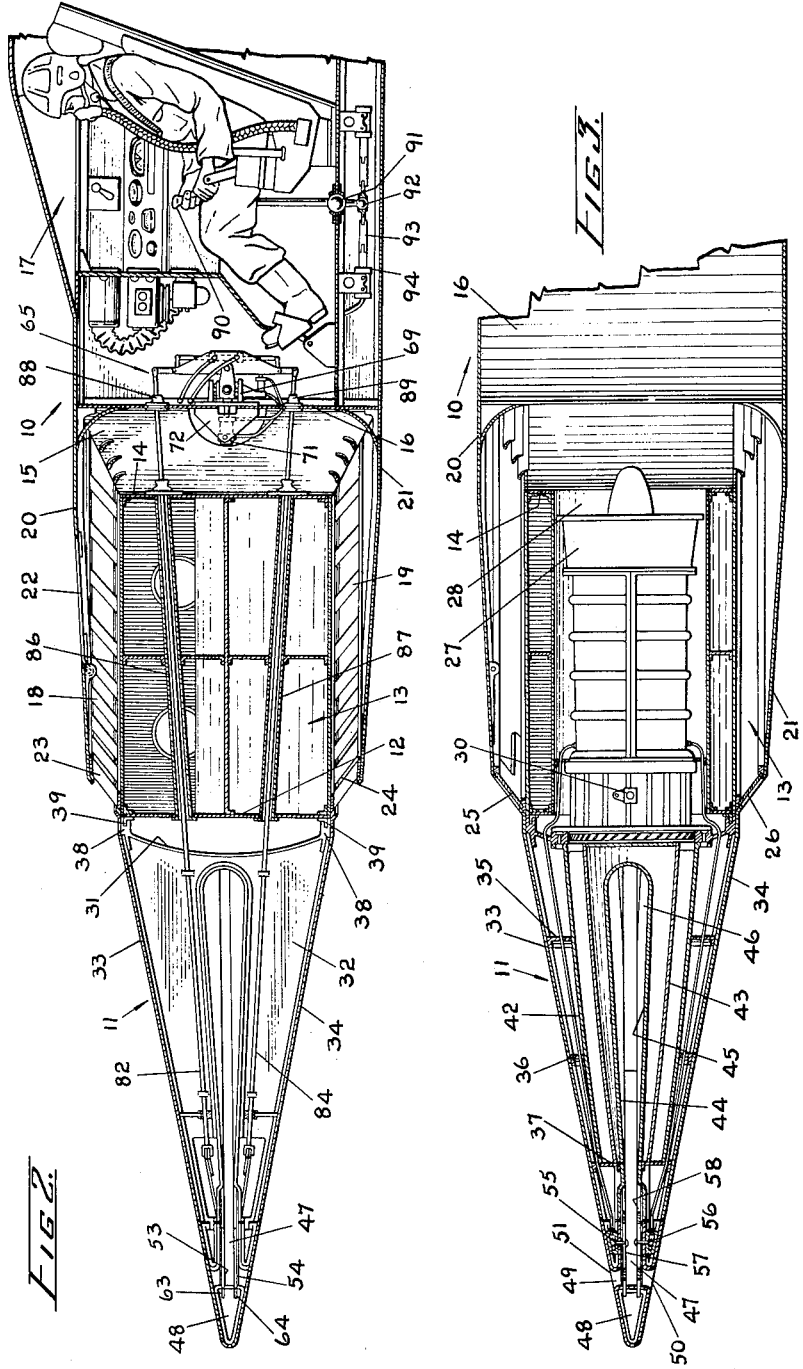

Feb. 6, 1962  J. C. M. FROST  3,020,002
VERTICAL TAKE-OFF AIRCRAFT CONTROL
Filed May 9, 1955  7 Sheets-Sheet 3

INVENTOR
J. C. M. FROST
BY
Maybee & Legris
ATTORNEYS.

Feb. 6, 1962 J. C. M. FROST 3,020,002
VERTICAL TAKE-OFF AIRCRAFT CONTROL
Filed May 9, 1955 7 Sheets-Sheet 4
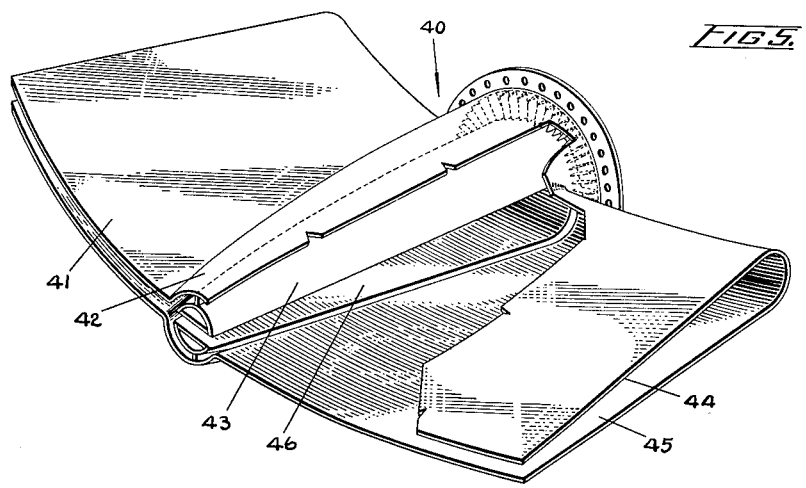
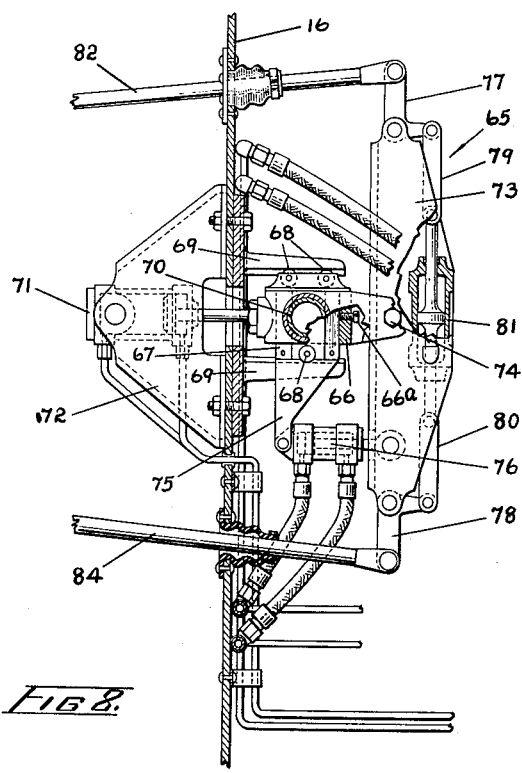
INVENTOR
J. C. M. FROST
BY
*Maybee & Legris*
ATTORNEYS.

Feb. 6, 1962 J. C. M. FROST 3,020,002
VERTICAL TAKE-OFF AIRCRAFT CONTROL
Filed May 9, 1955 7 Sheets—Sheet 5
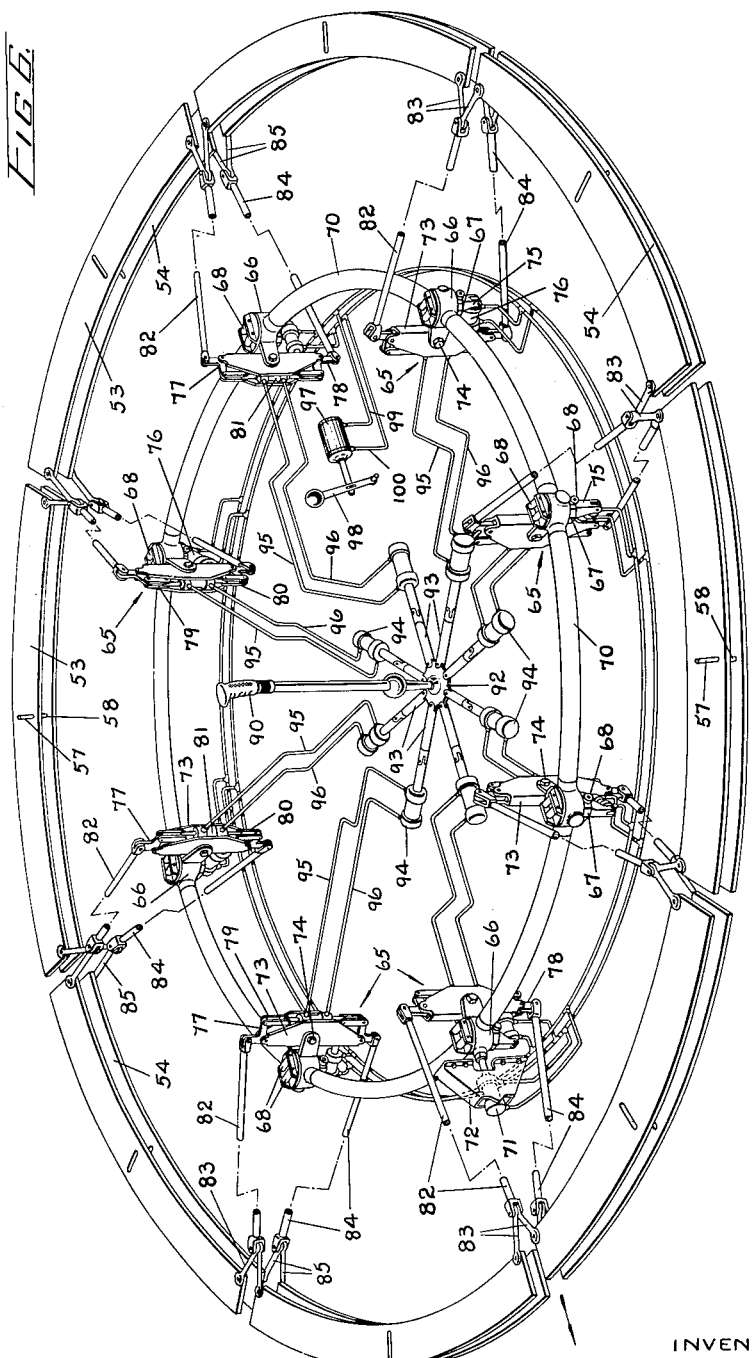
INVENTOR
J. C. M. FROST
BY
Maybee & Legris
ATTORNEYS.

Feb. 6, 1962 J. C. M. FROST 3,020,002
VERTICAL TAKE-OFF AIRCRAFT CONTROL
Filed May 9, 1955 7 Sheets-Sheet 6
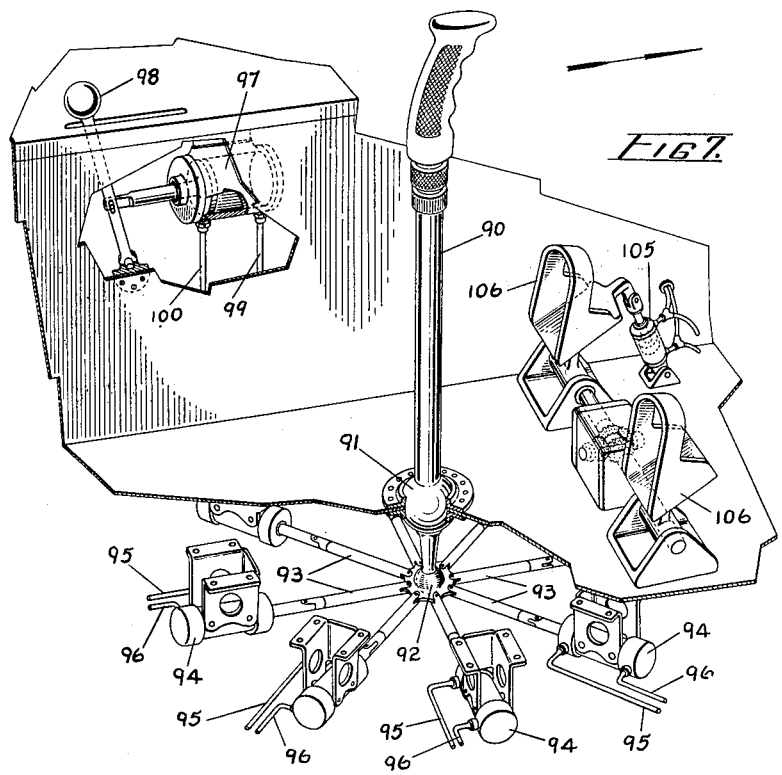
INVENTOR
J. C. M. FROST
BY Maybee & Legris
ATTORNEYS.

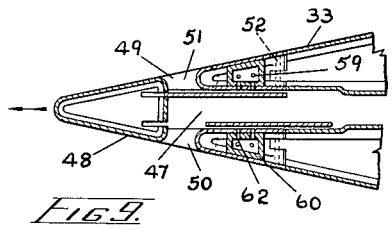
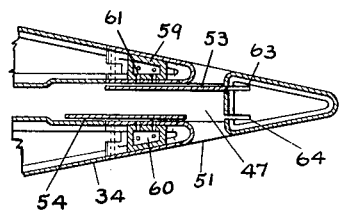
FIG.9.
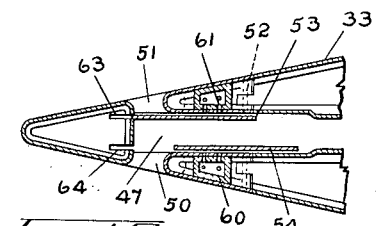
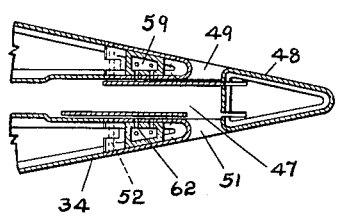
FIG.10.
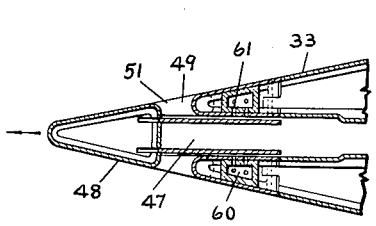
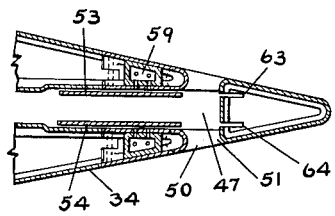
FIG.11.
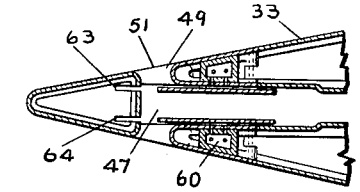
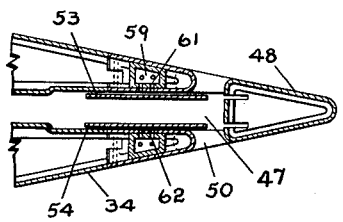
FIG.12.

United States Patent Office 3,020,002
Patented Feb. 6, 1962

3,020,002
VERTICAL TAKE-OFF AIRCRAFT CONTROL
John Carver Meadows Frost, Georgetown, Ontario, Canada, assignor, by mesne assignments, to Avro Aircraft Limited, Malton, Ontario, Canada, a corporation of Canada
Filed May 9, 1955, Ser. No. 507,099
Claims priority, application Great Britain May 11, 1954
14 Claims. (Cl. 244—15)

This invention relates to the propulsion and control of disc-type or circular aircraft deriving a propulsive thrust from a stream of high-speed gases flowing within the aircraft in generally radial directions and discharged from the periphery thereof. The invention is believed to be a significant improvement over the aircraft disclosed in the co-pending patent application of John Carver Meadows Frost and Thomas Desmond Earl, Serial No. 688,804, filed on October 1, 1957, and entitled "Disc-Type Aircraft."

Although the aircraft of the aforementioned co-pending application has many desirable features, it has been found that undesirably high operating forces are required to move the perimetrical annular member whereby flight control is achieved. This is because in flight the member is subjected to high aerodynamic loads, and any change in its position must be made against these loads. It therefore is the main object of the present invention to provide a disc-type aircraft having flight controls which require a minimum control operating force.

It is another object of the invention to provide a disc-type aircraft capable of destroying an enemy aircraft by ramming without suffering serious damage to itself.

The foregoing and other objects and advantages of the invention will become apparent from a study of the following specification, taken in conjunction with the accompanying drawings, in which like reference characters indicate corresponding parts throughout the several views, and in which:

FIG. 1 is a perspective view of an aircraft constructed in accordance with the invention;

FIG. 2 is a radial sectional view of the aircraft taken along the line 2—2 of FIG. 1;

FIG. 3 is a radial sectional view of the aircraft taken along the line 3—3 of FIG. 1;

FIG. 5 is a perspective view, partly broken away, of an engine exhaust nozzle assembly and exhaustor duct;

FIG. 6 is a perspective view of the shutters and shutter controls of the aircraft, the shutter controls being shown to an enlarged scale for the sake of clarity;

FIG. 7 is a fragmentary perspective view showing the main pilot operated controls in the pilot's compartment;

FIG. 8 is a side elevational view, partly in section, of the forward control jack assembly;

FIG. 9 is a fragmentary longitudinal diametrical cross-sectional view of the aircraft, showing particularly the positions of the forward and aft portions of the nozzle shutters in vertical take-off;

FIG. 10 is a fragmentary transverse diametrical cross-sectional view of the aircraft, showing particularly the positions of the port and starboard portions of the nozzle shutters in vertical take-off;

FIG. 11 is a fragmentary longitudinal diametrical cross-sectional view of the aircraft, showing particularly the positions of the forward and aft portions of the nozzle shutters in forward flight.

FIG. 12 is a fragmentary transverse diametrical cross-sectional view of the aircraft, showing particularly the positions of the port and starboard portions of the nozzle shutters in forward flight.

Figure 4:
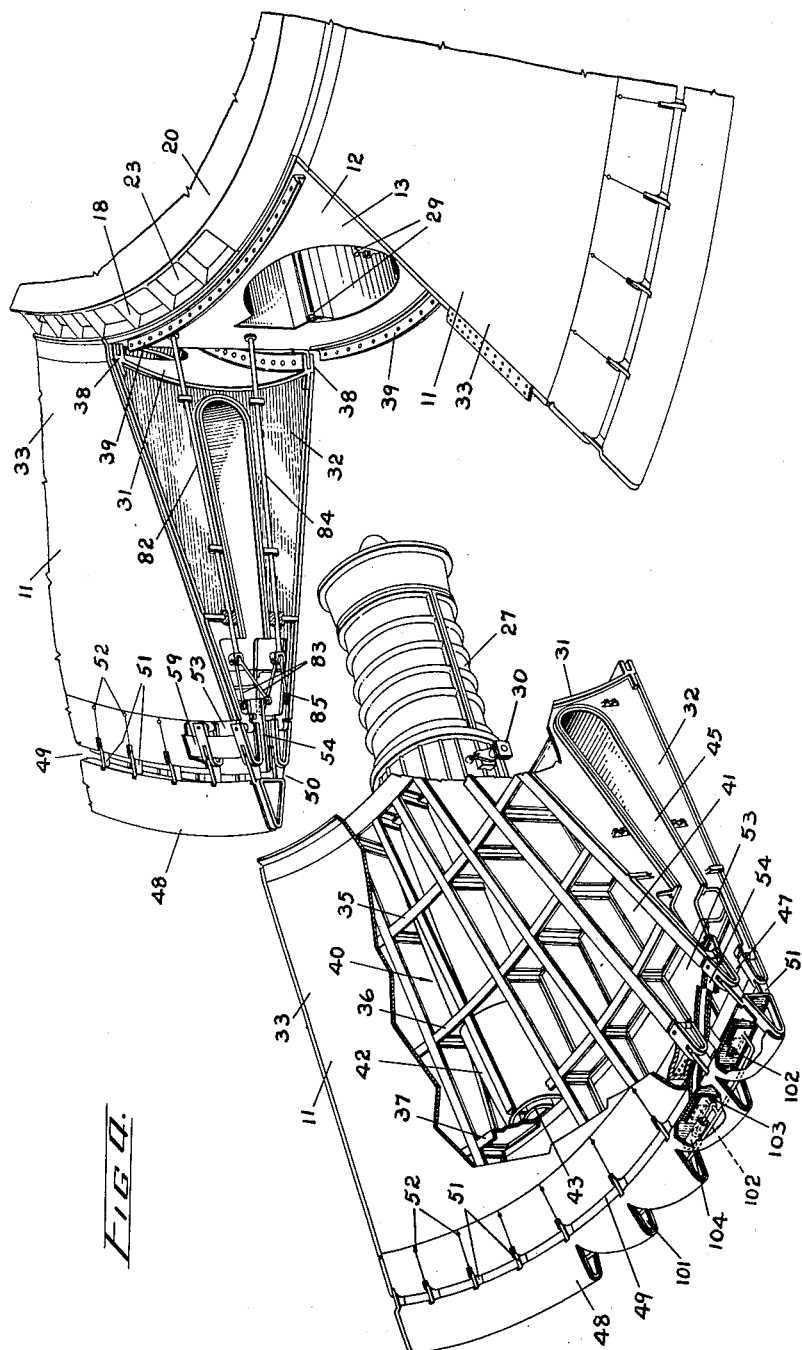
FIG. 4 is a perspective view of a portion of the aircraft with a segment detached, and parts of the segment being broken away to show some of its interior.

For greater convenience, throughout the description certain terms of positional relationship are used. The terms "outboard" (or "outboardly") and "inboard" (or "inboardly") denote, respectively, greater and lesser distances from the directional axis of the aircraft, and the terms "outer" and "inner" denote greater and lesser distances from a medial plane between the aerofoil surfaces of the aircraft.

The aircraft of the invention is substantially circular in plan form, and in elevation it presents flat double convex surfaces on the central portion of each of which protrude frusto-conical structures; it can be said that the structure is lentiform. The aircraft which is described may be divided into two main sections, namely a core 10 and a series of segments 11 (which preferably are annulus sectors) removably secured to each other and to the core, the segments when secured to each other constituting an annular structure. The structure of the aircraft and of its engine arrangement are not claimed as part of the present invention. They are described in considerably greater detail in the copending application of John Carver Meadows Frost and Thomas Desmond Earl, Serial No. 507,100 filed on May 9, 1955, and entitled "Disc Aircraft With Multiple Radially Disposed Gas Turbine Engines."

The core 10 is defined by an outboard wall which may be the outboard wall 12 of an annular fuel tank 13. Secured to the inboard cylindrical wall 14 of the tank and extending radially inboardly is a series of shear webs 15 which support at their inboard edges a cylindrical shell 16 defining a pilot's compartment 17.

Circumferentially arranged on the upper and on the lower walls of the fuel tank adjacent its outboard periphery are inboardly inclined ribs 18 and 19 which support respectively an upper central skin 20 and a lower central skin 21 in spaced relationship from the upper tank wall and the lower tank wall respectively. The spaces between the upper tank wall and the upper skin, between the lower tank wall and the lower skin, and between the inboard tank wall 14 and the cylindrical shell 16 provide an annular plenum chamber. On the upper skin 20 are circumferentially arranged air inlets which are normally closed by spring loaded doors 22. Additional air inlets 23 and 24 are adapted to be closed by pilot-operated sliding doors 25 and 26 respectively.

The engines 27 are located in radially disposed passages provided by generally cylindrical open-ended shells 28 which extend from the outboard tank wall 12 to the inboard tank wall 14; obviously the ends of the shell are hermetically sealed to the tank walls. Suitable interengaging tracks 29 and mounting blocks 30 are provided on the shell and on the engine respectively so that the engine conveniently may be slid into its passage and securely held therein, with its intake end in registration with the plenum chamber and its outlet end extending out of the core 10 of the aircraft.

The eight annulus sectors 11 are similar to each other; they are removably secured to each other and to the core, and together they constitute an annular structure. Each sector comprises an inboard wall 31 and a series of radially extending substantially triangular ribs 32 covered on their outer edges by upper skin segments 33 and lower skin segments 34. The skin segments 33 and 34 of the eight sectors and the central skins 20 and 21 of the core 10 together constitute the aerofoil surfaces of the aircraft. Three series of circumferentially spaced intercostals 35, 36 and 37 extend between adjacent ribs and are secured thereto. The sectors may be secured firmly to the core 10 of the aircraft by means of U-shaped members 38 which engage angle brackets 39 on the core wall 12. The edges of adjacent sectors may be secured to each other by any suitable means such as by butt straps.

In each of the sectors is incorporated an exhaust passage constituted by an exhaust nozzle assembly generally indicated at 40 and by an exhaustor duct 41 (see FIGS. 4 and 5). The exhaust nozzle assembly includes an outboardly tapering outer casing 42 within which is a saddle-shaped core 43; the inboard ends of the casing and of the core are circular and together they provide the end of an annular exhaust nozzle adapted to register with a turbine outlet, whilst their outboard ends abut one of the intercostals 37 and are closed thereby. The casing 42 fairs into the spaced upper and lower walls 44 and 45 of the exhaustor duct 41, and a diametrically extending slot 46 is provided in the core 43 to give continuity to the exhaustor duct. The upper skin 33 and the lower skin 34 at their outboard edges meet with the upper and lower walls 44 and 45 of the exhaustor duct to provide an exhaust outlet 47. The exhaustor ducts of the sectors are in end-to-end registration, and together they constitute an annular duct which can be said to encompass the engine outlets.

Spaced from the perimeter of the exhaust outlet 47 and defining the perimeter of the aircraft is a ring 48 which is triangular in cross-section, its inboard face being opposed to and spaced from the exhaust outlet 47 and the other two faces converging towards each other and providing continuations of the skins 33 and 34. The gaps between the outboard edges of the skins 33 and 34 and the inboard edges of the converging faces of the ring can be considered to be annular slots in the aerofoil surfaces, and these annular slots together with the exhaust outlet 47 and the space between the inboard face of the ring 48 and the perimeter of the said exhaust outlet provide an upper annular exhaust nozzle 49 and a lower annular exhaust nozzle 50. The ring is secured to the ribs through inboardly diverging arms 51 which are attached to the ends of the ribs by pins 52.

Movable shutters 53 and 54, each consisting of eight sections, are provided for the nozzles 49 and 50. The shutters are slidably mounted on recessed portions of the exhaustor duct walls 44 and 45, being held thereagainst by headed bolts 55 and 56 which pass through slots 57 and 58 in the shutters. To reduce friction between the surfaces of the shutters and the walls 44 and 45, annular pressure boxes 59 and 60 are provided in each sector, and these communicate with the last stage of the compressor of the engine attached to the particular sector. Air escapes through holes 61 and 62 provided in the pressure box inner walls and in the walls 44 and 45 into the spaces between the latter walls and the shutters, so that in effect air bearings are provided for the shutters.

The shutters are adapted to slide outboardly to close the nozzles and inboardly to open them. The outboard edges of the shutters may be brought into registration with slots 63 and 64 in the inboard face of the ring 48.

Mounted in an equiangular arrangement on the cylindrical shell 16 are eight similar shutter motor units generally indicated at 65. Each unit comprises a hollow body 66 within which is spigoted an octagonal head 67 which may be firmly attached to the body in the required angular relationship by a screw 66a; the head and the body may be assembled in any one of eight different angular relationships. On the upper and on the lower faces of the heads 67 are provided roller bearings 68 which are adapted to slide on retaining ways 69 mounted on the cylindrical shell 16. It will be observed from FIG. 6 that the roller bearings 68 for all eight motor units are so oriented that the motor units can slide only in a fore and aft direction relative to the longitudinal axis of the aircraft; obviously, the ways 69 on which the roller bearings are slidable are oriented similarly. The eight motor units are interlinked by curved tubular sections which together provide a rigid ring 70. Thus, the eight motor units cannot move relative to each other but they are constrained to move in unison, and only in a fore and aft direction.

The fore and aft movement of the eight motor units 65 rigidly connected together by the ring 70 is effected by a jack 71 the casing of which is anchored to the wall 16 by a bracket and pin assembly 72 and the piston of which is connected to the body 66 of the front motor unit. Actuation of the jack 71 will cause the ring and the eight motor units to move in a fore and aft direction.

Each motor unit also includes an arm 73 which is secured at its centre by a pivot 74 to an extension of the body 66. Extending downwardly from the head 67 is a bracket 75 which is so oriented relative to the head 67 that a jack 76 pivotally secured to its lower end has its longitudinal axis disposed radially with respect to the ring 70. The piston of the jack 76 is pivotally connected to the arm 73 adjacent its lower end. Operation of the jack 76 will cause swinging movement of the arm 73 about the pivot 74 so that as its lower end moves inboardly its upper end moves outboardly.

Pivotally mounted at the upper and at the lower ends respectively of the arm 73 are bell cranks 77 and 78 connected by links 79 and 80 respectively to the piston of a jack 81. As may be seen particularly from FIG. 8, when the piston of the jack 81 is centrally located the two bell cranks are similarly disposed, whilst if the piston is moved from its central position the free arm of one bell crank moves inboardly while the free arm of the other bell crank moves outboardly; thus the bell cranks operate differentially.

The free arm of the upper bell crank 77 of each motor unit 65 is connected through a control rod 82 and links 83 to the mutually adjacent ends of the shutter segments of the upper shutter 53 which are located radially opposite the particular motor unit. Similarly, the free arm of the lower bell crank 78 of each motor unit is connected through a control rod 84 and links 85 to the mutually adjacent ends of the shutter segments of the lower shutter 54 which are located radially opposite the particular motor unit. The control rods 82 and 84 respectively pass through tubes 86 and 87 which span from the outboard wall 12 of the fuel tank 13 to its inboard wall 14. Suitable seals 88 and 89 are provided where the control rods pass through the cylindrical shell 16.

Inboard and outboard movement of the shutters 53 and 54 may thus be effected by three agencies. Firstly, an upward movement of the piston of any jack 81 relative to its central position will cause an outboard movement of the upper shutter portion and an inboard movement of the lower shutter portion radially opposite the particular jack. A downward movement of the piston of any jack 81 obviously operates the shutters in a manner converse to that described. As will be described subsequently, the eight jacks 81 are controlled in such a manner that diametrically opposite jacks invariably operate inversely to each other. Secondly, inboard movements of the pistons of the jacks 76 will swing the upper ends of the arms 73 outboardly and their lower ends inboardly, thus causing outboard movement of the upper shutter 53 and inboard movement of the lower shutter 54. As will be explained subsequently, all of the eight jacks 76 operate in unison so that the entire upper shutter and the entire lower shutter respectively move outboardly and inboardly (or vice versa) as a result of the operation of the jacks 76. Finally, actuation of the jack 71 will cause the eight motor units 65 to move in a fore and aft direction, thus moving the upper and lower shutters forwardly or rearwardly.

A control column 90 is pivoted on a universal joint 91 in the floor of the pilot's compartment 17 and it terminates at its lower end in a ball and socket joint 92. Rod and link mechanisms 93 radiate from the joint 92, and they are operably connected to the pistons of equiangularly spaced hydraulic pumps 94. Each pump 94 is connected at opposite ends through tubes 95 and 96 to the opposite ends of the jack 81 of the radially opposite motor unit 65.

It will be apparent, particularly from an examination of FIG. 6, that movement of the control column 90 in any direction will cause a downward movement of the piston of the jack 81 which is located in the direction and sense of the particular movement of the control column, and will cause an upward movement of the piston of the jack 81 of the motor unit which is located in the direction of but in the opposite sense to the movement of the control column. The jacks 81 of motor units which are located in positions intermediate the direction of a particular movement of the control column will respond only to the vectorial component of motion with which they are directly in line. Movement of the control column 90 in any direction relative to its central or neutral position therefore causes a differential movement of the upper shutter 53 and of the lower shutter 54. As an example, if the control column is moved towards port, the port portion of the upper shutter and the starboard portion of the lower shutter will move inboardly to increase the effective openings in the port portion of the upper nozzle 49 and in the starboard portion of the lower nozzle 50, and the port portion of the lower shutter and the starboard portion of the upper shutter will move outboardly to decrease the effective openings in the port portion of the lower nozzle 50 and in the starboard portion of the upper nozzle 49.

In the pilot's compartment also is located a two-position pump 97, the piston of which may be moved from one position to the other by a selector handle 98. The pump 97 is connected at opposite ends by means of distributor lines 99 and 100 to the opposite ends of the jacks 76 of each of the motor units 65 and to the opposite ends of the jack 71. In FIGS. 6 and 7 the selector handle 98 is shown in "flight position." In that position, the eight motor units 65 and their ring 70 have been caused to move forwardly in unison, thus closing the forward portions of both the nozzles 49 and 50 by means of the shutters 53 and 54 and opening the remaining portions, the nozzle openings progressively increasing from the extreme forward portion to the extreme aft portion. If the selector handle is moved to the alternative or "take-off position," the jack 71 will cause the eight motor units 65 and the ring 70 to move rearwardly in unison, and simultaneously the jacks 76 of the eight motor units will swing the upper ends of the arms 73 outboardly and their lower ends inboardly, thus moving the upper shutter 53 outboardly to close the upper nozzle and moving the lower shutter 54 inboardly to open the lower nozzle.

The positions of the shutters when the selector handle 98 is at take-off position are shown in FIGS. 9 and 10. It will be noted that in that position the upper nozzle 49 is fully closed while the lower nozzle 50 is fully open. The positions of the shutters when the selector handle is at flight position are shown in FIGS. 11 and 12. The forward portions of both the upper and lower nozzles are then fully closed, the aft portions are fully open, and the port and starboard portions are partially open; more specifically, the shutters are so positioned that the effective openings in the nozzles progressively increase from the extreme forward portions to the extreme aft portions.

Referring particularly to FIGS. 1 and 4, louvres 101 are provided on the port and starboard portions of the ring 48; air from the exhaust outlet 47 may be supplied to the louvres through rudder ports 102 which are located in the inboard face of the ring. Suitable shutters 103 to open and close these ports are hydraulically actuated by jacks 104 controlled by a pump 105 which is operated by a pair of differentially connected rudder pedals 106 in the pilot's compartment.

Directional control of the aircraft is effected by selective opening and closing of the rudder ports 102 through the operation of the rudder pedals. The additional thrust component caused by the exhaust gases ejected selectively through the port or starboard louvres 101 is sufficient to cause an unbalance of the forces about the directional axis of the aircraft to provide directional control.

On take-off the pilot closes the air inlets 23 and 24 by means of the sliding shutters 25 and 26 to prevent the entrance into the lower inlet of the hot products of combustion ejected from the lower nozzle 50. This causes the spring loaded doors 22 to open automatically by reason of the fact that the pressure differential between the plenum chamber and the atmosphere overcomes the spring forces. In forward flight the pilot opens the sliding shutters so that the air then enters the inlets 23 and 24, and the spring loaded doors 22 close automatically.

The engines 27 of the aircraft in which the invention is embodied are of the well known axial flow type. The air after entering the plenum chamber through the open inlet or inlets is drawn into the intakes of each of the engines to be compressed in an axial flow compressor, then is passed through a combustion system to which fuel is added, and is allowed to expand through a turbine which drives the compressor. The products of combustion are exhausted through the exhaust nozzle assembly 40 and the exhaustor duct 41, and finally to atmosphere through one or both of the nozzles 49 and 50.

To take off, the pilot after closing the air inlets 23 and 24 sets the selector handle 98 at take-off position thus closing the upper nozzle 49 and opening the lower nozzle 50. The gases consequently are ejected downwardly from the lower nozzle 50, and because of the "ground cushion" effect the aircraft, which may have a weight greater than the combined static thrust of all the engines, rises vertically above the ground.

In order to transfer to forward flight, the pilot slowly moves the selector handle 98 to flight position, thus closing the forward portions of both the upper and lower nozzles 49 and 50 and opening the remaining portions. This movement of the selector handle into flight position is done slowly so that the vertical lift from the downwardly directed gases is only gradually destroyed as the aircraft picks up speed and acquires lift resulting from the aerodynamic forces on the aerofoil surfaces.

As soon as the aircraft has risen from the ground and is in forward flight the air inlets 23 and 24 may be opened, causing the spring loaded doors 22 to close automatically; this allows the aircraft to take advantage of ram in the intake.

Both while taking off and in forward flight, the pilot can effect longitudinal and lateral control of the aircraft by appropriate movements of the control column.

By making the nose section of the ring 48 of armour plate, as shown at 107, enemy aircraft can be destroyed without appreciable danger to the aircraft of the invention, by the simple method of ramming. The aircraft of the invention will not sustain any damage because of its high speed (of the order of Mach 2.75 in level flight) and the attendant high energy potential which allows the aircraft to penetrate and pass through a target.

The form of the invention herein shown and described is to be considered merely as an example. The details of the hydraulic control system are essentially schematic and by way of example only, and they are not essential parts of the invention. Obviously many changes in the construction shown not only are possible but may be desirable in order that the aircraft may have optimum performance. Such changes may, of course, be made without departing from the spirit of the invention or the scope of the subjoined claims.

What I claim as my invention is:

1. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, individual shutters for the nozzles and separately movable to vary the nozzle openings, and shutter control means operable to move the shutters selectively and thus control the relative magnitudes of the streams from the nozzles.

2. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, each of the nozzles extending around the periphery of the structure, individual shutters for the nozzles and separately movable to vary the nozzle openings, and shutter control means operable to move the shutters selectively and thus control the relative magnitudes of the streams from the nozzles.

3. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, individual shutters for the nozzles and separately movable to vary the nozzle openings, and a control for the shutters to operate the shutters in unison and conditionable to a first condition to substantially close the upper nozzle and open the lower nozzle and to a second condition to open both nozzles.

4. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, individual shutters for the nozzles and separately movable to vary the nozzle openings, and a control for the shutters to operate the shutters in unison and conditionable to a first condition to substantially close the upper nozzle and open the lower nozzle and to a second condition to partly open both nozzles.

5. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, individual shutters for the nozzles and separately movable to vary the nozzle openings, and a control for the shutters to operate the shutters in unison and conditionable to a first condition to substantially close the upper nozzle and open the lower nozzle and to a second condition to close the forward portions of both nozzles and open the remaining portions.

6. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, individual shutters for the nozzles and separately movable to vary the nozzle openings, and a control for the shutters to operate the shutters in unison and conditionable to a first condition to substantially close the upper nozzle and open the lower nozzle and to a second condition to open both shutters to an extent which provides substantially zero nozzle openings at the extreme forward portions of the nozzles and maximum nozzle openings at the extreme aft portions of the nozzles, the nozzle openings progressively increasing from the said extreme forward portions to the said extreme aft portions.

7. An aircraft comprising a generally lentiform structure sheathed by opposed aerofoil surfaces which provide lift developing surfaces, engine means within the structure and embodying an air displacement passage having an intake and an outlet, an annularly arranged slot in each of the aerofoil surfaces adjacent its perimeter, exhaust passages connecting each of the slots with the outlet of the engine means, the slots and passages thus providing annularly arranged nozzles through which the air from the engine means may be ejected in two streams having opposite components of thrust, individual shutters for the nozzles and separately movable to vary the nozzle openings, and shutter control means operable to move the shutters selectively and thus control the relative magnitudes of the streams from the nozzles.

8. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, individual shutters for the nozzles and separately movable to vary the nozzle openings, and a differential control for the shutters to move corresponding portions of the two shutters differentially thus decreasing the opening of a portion of one nozzle as the opening of the corresponding portion of the other nozzle is increased.

9. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper nozzle and a lower nozzle through which the air from the engine means may be ejected in two streams having opposite components of thrust, individual shutters for the nozzles and separately movable to vary the nozzle openings, a control for the shutters to operate the shutters in unison and conditionable to a first condition to substantially close the upper nozzle and open the lower nozzle and to a second condition to close the forward portions of both nozzles and open the remaining portions, and a differential control for the shutters superimposed on the first-mentioned control to move corresponding portions of the two nozzles differentially thus decreasing the opening of a portion of one nozzle as the opening of the corresponding portion of the other nozzle is increased.

10. An aircraft comprising a generally lentiform structure sheathed by opposed aerofoil surfaces which provide lift developing surfaces, engine means within the structure and embodying an air displacement passage having an intake and an outlet, an annular duct provided by generally parallel upper and lower walls encompassing the outlet of the engine means, a ring spaced from the perimeter of the duct and defining the perimeter of the aircraft, an annularly disposed slot in each of the aerofoil surfaces and in registration with the space between the ring and the perimeter of the duct, the slots, the duct and the space between the ring and the perimeter of the duct providing annular nozzles through which the air from the engine means may be ejected in two streams having opposite components of thrust, a group of annularly arranged shutter plates mounted adjacent each of the duct walls for sliding movement towards and away from the ring to close and open the nozzles to varying extents, and shutter control means operable to move the shutter plates selectively and thus control the relative magnitudes of the streams from the two nozzles.

11. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper annularly arranged nozzle and a lower annularly arranged nozzle through which the air from the engine means may be ejected in two streams having opposite components of thrust, individual shutters for each nozzle, each shutter including a plurality of annularly arranged shutter segments slidable outboardly and inboardly to close and open the nozzles, the shutter segments for opposed portions of the upper and lower nozzles providing pairs of shutter segments, motor units connected to pairs of segments and linked thereto to move the shutters into nozzle-closing and nozzle-opening positions, the motor units including elements which when actuated move in one sense the upper segments of the pairs to which the respective units are connected and move in the opposite sense the lower segments of the said pairs, the said elements thus opening and closing the opposed portions of the nozzles differentially, and pilot-operated means to selectively actuate the motor unit elements.

12. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper annularly arranged nozzle and a lower annularly arranged nozzle through which the air from the engine means may be ejected in two streams having opposite components of thrust, individual shutters for each nozzle, each shutter including a plurality of annularly arranged shutter segments slidable outboardly and inboardly to close and open the nozzles, the shutter segments for opposed portions of the upper and lower nozzles providing pairs of shutter segments, motor units connected to pairs of segments and linked thereto to move the shutters into nozzle-closing and nozzle-opening positions, the motor units including elements which when actuated move in one sense the upper segments of the pairs to which the respective units are connected and move in the opposite sense the lower segments of the said pairs, the said elements thus opening and closing the opposed portions of the nozzles differentially, pilot-operated means to selectively actuate the motor unit elements, and means of the pilot-operated means operatively linking the elements of motor units connected to the shutter segments of diametrically opposite upper and lower nozzle portions to move in unison in substantially the same direction and sense the shutter segments of diametrically opposite upper nozzle portions and to move in unison in substantially the same said direction but in a sense opposite to the said sense the shutter segments of diametrically opposite lower nozzle portions.

13. An aircraft comprising a generally lentiform structure sheathed by opposed aerofoil surfaces which provides lift developing surfaces, engine means within the structure and embodying an air displacement passage having an intake and having an annularly arranged outlet adjacent the perimeter of the structure, the outlet including an upper annularly arranged nozzle and a lower annularly arranged nozzle through which the air from the engine means may be ejected in two streams having opposite components of thrust, individual shutters for each nozzle, each shutter including a plurality of annularly arranged shutter segments slidable outboardly and inboardly to close and open the nozzles, the shutter segments for opposed portions of the upper and lower nozzles providing pairs of shutter segments, motor units connected to pairs of segments and linked thereto to move the shutters into nozzle-closing and nozzle-opening positions, the motor units including elements conditionable to a first condition to position the upper shutters in upper nozzle closing position and to position the lower shutters in lower nozzle opening position and conditionable to a second condition to position the upper and the lower shutters in substantially equal partial nozzle closing positions, means interconnecting the motor units including means to shift the units in unison in a fore and aft direction and thus move the shutters connected thereto in a fore and aft direction, the said shifting means being conditionable to a first condition where the units position the shutters concentrically relative to the angularly arranged nozzles and to a second condition where the units position the shutters in a position eccentric of the said concentric position and forward thereof, and pilot-operated means to condition the elements and the motor unit shifting means at their first condition and thus close the upper nozzle and open the lower nozzle and to alternatively condition the elements and the motor unit shifting means at their second condition to close the forward portions of both nozzles and open the remaining portions.

14. An aircraft comprising a generally lentiform structure sheathed by opposed aerofoil surfaces which provide lift developing surfaces, engine means within the structure and embodying an air displacement passage having an intake and having an annularly arranged outlet adjacent the perimeter of the structure, the outlet including an upper annularly arranged nozzle and a lower annularly arranged nozzle through which the air from the engine means may be ejected in two streams having opposite components of thrust, individual shutters for each nozzle, each shutter including a plurality of annularly arranged shutter segments slidable outboardly and inboardly to close and open the nozzles, the shutter segments for opposed portions of the upper and lower nozzles providing pairs of shutter segments, motor units connected to pairs of segments and linked thereto to move the shutters into nozzle-closing and nozzle-opening positions, the motor units including first elements which when actuated move in one sense the upper segments of the pairs to which the respective units are connected and move in the opposite sense the lower segments of the said pairs, the said first elements thus opening and closing the opposed portions of the nozzles differentially, a first pilot-operated means to selectively actuate the motor unit first elements, means of the first pilot-operated means operatively linking the first elements of motor units connected to the shutter segments of diametrically opposite upper and lower nozzle portions to move in unison in substantially the same direction and sense the shutter segments of diametrically opposite upper nozzle portions and to move in unison in substantially the same said direction but in a sense opposite to the said sense the shutter segments of diametrically opposite lower nozzle portions, the motor units also including second elements conditionable to a first condition to position the upper shutters in upper nozzle closing position and to position the lower shutters in lower nozzle opening position and conditionable to a second condition to position the upper and lower shutters in substantially equal partial nozzle closing positions, means interconnecting the motor units including means to shift the units in unison in a fore and aft direction and thus move the shutters connected thereto in a fore and aft direction, the said shifting means being conditionable to a first condition where the units position the shutters concentrically relative to the annularly arranged nozzles and to a second condition where the units position the shutters in a position eccentric of the said concentric position and forward thereof, and a second pilot-operated means to condition the second elements and the motor unit shifting means at their first condition and thus close the upper nozzle and open the lower nozzle and to alternatively condition the second elements and the motor unit shifting means at their second condition to close the forward portions of both nozzles and open the remaining portions.

References Cited in the file of this patent

FOREIGN PATENTS 1,047,657    France _____ July 29, 1953